United States Patent
Look

[19]

[11] Patent Number: 5,915,032
[45] Date of Patent: Jun. 22, 1999

[54] METHOD AND APPARATUS FOR MACHINE READING OF RETROREFLECTIVE VEHICLE IDENTIFICATION ARTICLES

[75] Inventor: Thomas F. Look, Ham Lake, Minn.

[73] Assignee: Minnesota Mining and Manufacturing Company, St. Paul, Minn.

[21] Appl. No.: 07/742,053

[22] Filed: Aug. 6, 1991

Related U.S. Application Data

[63] Continuation of application No. 07/397,127, Aug. 22, 1989, abandoned.

[51] Int. Cl.$^6$ .................................................... G06K 9/00
[52] U.S. Cl. ............................................................ 382/100
[58] Field of Search ................................ 382/1.8, 48, 57; 364/467, 468, 464; 356/71–73, 221, 223, 566

[56] References Cited

U.S. PATENT DOCUMENTS

| | | | |
|---|---|---|---|
| 3,550,084 | 12/1970 | Bigelow et al. | 340/146.3 |
| 3,604,805 | 9/1971 | Scott | 356/28 |
| 3,617,707 | 11/1971 | Shields et al. | 235/61.11 E |
| 3,783,273 | 1/1974 | Strohschneider | 250/223 |
| 3,944,979 | 3/1976 | Kwok | 340/146.3 |
| 4,368,979 | 1/1983 | Ruell | 356/71 |
| 4,491,923 | 1/1985 | Look | 364/478 |
| 4,567,609 | 1/1986 | Metcalf | 382/9 |
| 4,603,390 | 7/1986 | Mehdipour et al. | 364/467 |
| 4,731,854 | 3/1988 | Gonzalez | 382/1 |
| 4,817,166 | 3/1989 | Gonzalez et al. | 382/1 |
| 4,878,248 | 10/1989 | Shyu et al. | 382/1 |

FOREIGN PATENT DOCUMENTS

| | | | |
|---|---|---|---|
| 58-76981 | 5/1983 | Japan | G06K 9/20 |
| 62-121590 | 6/1987 | Japan | G06K 9/38 |
| 64-14698 | 1/1989 | Japan | G08G 1/04 |

OTHER PUBLICATIONS

IBM Technical Disclosure Bulletin, vol. 21, No. 9, Feb. 1979 (Dattilo et al.).

*Primary Examiner*—Jose L. Couso
*Attorney, Agent, or Firm*—Peter Forrest; Peter L. Olson

[57] ABSTRACT

An improved method and apparatus for machine reading of license plate numbers on license plates uses separate illumination sources to (1) identify and locate the license plate image within a field of view, and (2) to read the license plate number from the license plate image. The use of separate sources allows the use of preferred equipment and reduces power consumption of the system.

6 Claims, 1 Drawing Sheet

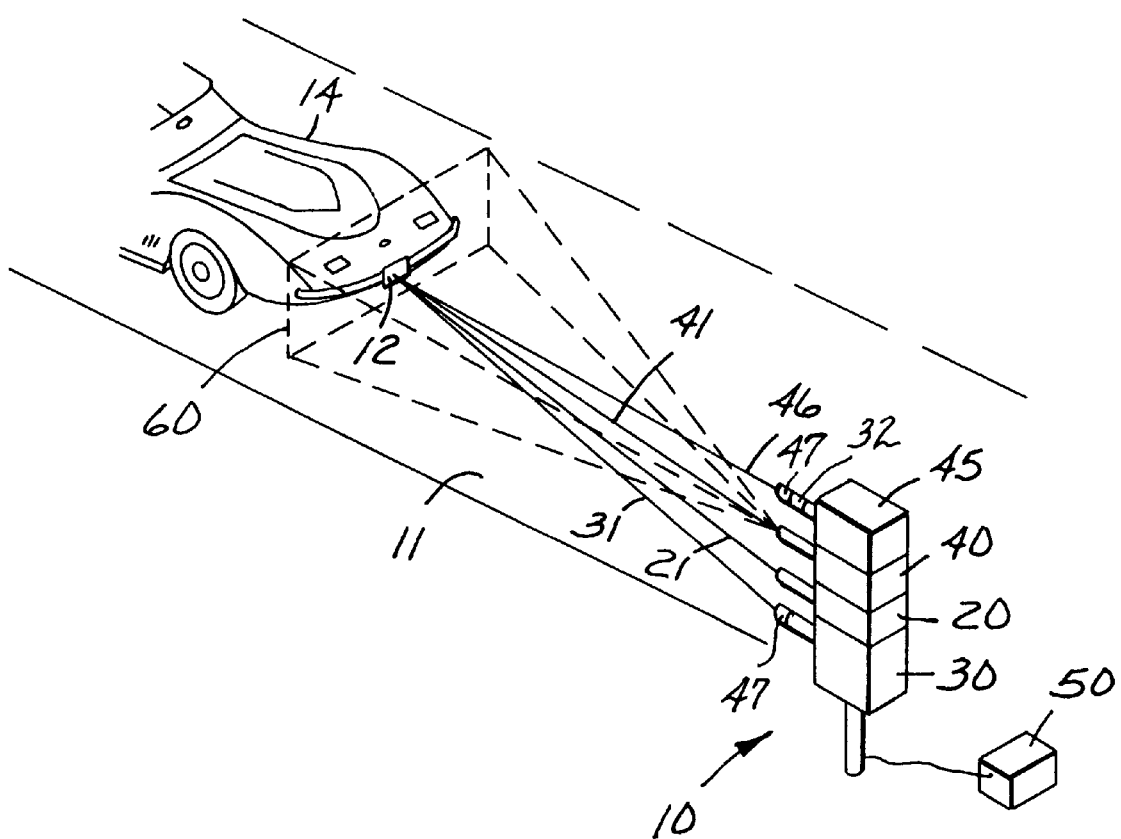

METHOD AND APPARATUS FOR MACHINE READING OF RETROREFLECTIVE VEHICLE IDENTIFICATION ARTICLES

This is a continuation of application Ser. No. 07/397,127 filed Aug. 22, 1989 now abandoned.

TECHNICAL FIELD

This invention concerns automated equipment which locates and reads retroreflective vehicle identification articles at a distance.

BACKGROUND

An example of a system which automatically locates retroreflective vehicle license plates and reads the alphanumeric characters on the license plates at a distance is taught in U.S. Pat. No. 4,491,923 (Look). The system operates in (at least) a two step process. First, the system illuminates a field of view through which vehicles pass. If a retroreflective license plate is within the field of view, the system detects the presence of a relatively small-sized but bright retroreflective image of the entire plate within the large field of view. Second, the system analyzes the license plate image by relying on the principle that the non-retroreflective or partially-retroreflective characters of the license plate number exhibit high contrast against the retroreflective plate background. The system uses a single source of illumination to detect the license plate and read the characters.

DISCLOSURE OF INVENTION

The invention is an improved method and apparatus for reading information on vehicle identification articles, such as license plates and license tabs. The invention uses a relatively low powered illumination source to detect the image of a article within a field of view, and a relatively high powered illumination source to read the information from the image of the article. In a preferred embodiment, the emitted power of the source used to read the image of the article is adjusted in response to variations in the reflected intensity of the illumination used to locate the article.

BRIEF DESCRIPTION OF THE DRAWING

The Drawing is schematic view of an embodiment of the invention.

DETAILED DESCRIPTION

The embodiment shown schematically in the Drawing is specifically illustrated for use with a retroreflective license plate, but it may be used with any vehicle identification article adapted for use with this invention, such as a license tab, parking validation sticker, and the like. The inventive system 10 comprises a low intensity illumination source 20, a high intensity illumination source 30, a detector 40, an analyzer 45, and electronics 50. (A synchronized shutter 32 on the analyzer 45, and a cross-polarizer arrangement in the form of a pair of polarizers 47, are each optional and discussed later.) Using one of the two illumination sources 20 and 30, the system 10 locates a retroreflective license plate 12 within a field of view 60, and reads the license plate number from the image of the license plate 12, in two separate steps.

In the first step, the system 10 detects the presence of the license plate 12 because of (1) the retroreflection and shape of the license plate 12 as a whole; and (2) the location of dark areas representing potential characters inside the retroreflective area. The low intensity illumination source 20 periodically emits low intensity illumination 21 into the field of view 60, preferably at least thirty times per second. If a moving vehicle 14 traveling on a road 11 carries a retroreflective license plate 12 into the field of view 60, the license plate 12 reflects the low intensity illumination 21 along a return path 41 to the detector 40. The electronics 50 receives the output of the detector 40 and determines the location of the license plate 12 within the field of view 60.

In the second step, the license plate is "read," i.e., the license plate image is analyzed for the contrast of any relatively dark license number characters against the relatively bright retroreflective plate background. The electronics 50 strobes the high powered illumination source 30 to emit high intensity illumination 31 into the field of view 60. The license plate 12 retroreflects the high intensity illumination 31 along a return path 46 to the analyzer 45. The analyzer 45 and electronics 50 extract the license number from a portion of the field of view 60 previously identified as the image of license plate 12.

The low intensity illumination source 20 may be an incandescent source or a xenon source. In a preferred embodiment, a 300 watt xenon source is used, such as ILC Technology Company model LX300F. A visible cut filter is used so that the low intensity illumination 21 comprises only near infrared (700–1100 nanometer wavelength) radiation.

The high intensity illumination source 30 may be a flash unit outputting twelve hundred watt-seconds, such as a twelve hundred watt Norman brand helical flash lamp. A parabolic reflector helps the high intensity illumination source 30 provide uniform illumination over essentially the entire area of the field of view 60. A visible cut filter is used so that the high intensity illumination 31 comprises only near infrared radiation.

Both illumination sources must be able to provide uniform illumination at their respective levels over essentially the entire area of the field of view 60.

While a single cell detector cannot measure license plate dimensions, or locate an image having light and dark regions within the image, it can be used to detect returned light from retroreflective surfaces. The front of a vehicle displays the license plate as well as other retroreflectors (e.g., turn signal indicators). Detection of any of these retroreflectors indicates the proper vehicle position. (The retroreflectors on the side of vehicle do not return sufficient light for detection because of the high entrance angle of the incoming light, 45° or more.) Thus, the detector 40 may be a single cell illumination sensor AC coupled through an amplifier to detect peaks of illumination in the field of view 60 as a whole; if the amplifier output is above a threshold value known to be due to a retroreflective license plate, the electronics 50 strobes the high power illumination source 30.

The analyzer 45 is preferably a solid-state, shuttered, charged-coupled-detector (CCD) type video camera, filtered so that only near infrared radiation is detectable. Suitable analyzers include a General Electric model 2710-A3, or a NEC model TI-23A, although other models having a resolution of at least one hundred twenty five thousand pixels may be used. The preferred model is a Sony model C-TEC TK66, which has four hundred fifty lines of horizontal resolution. The sample time of the analyzer 45 is preferably $\frac{1}{10,000}$th second, triggered by the electronics 50 in coordination with the strobing of the high intensity illumination source 30.

The image analysis is performed on digital data by electronics 50, which comprises conventional analog/digital converters, digital signal processors, and digital computers, as known in the art. A suitable set of equipment is any of Perceptics Corporation models IP-920, IP-921 (preferred), or IP-300.

The extraction of the license number from the image may involve any of several techniques known in the art. For example, U.S. Pat. No. 4,491,923 (Look) at column 8 lines 5–46, teaches "template matching," a technique which analyzes those observed configurations of adjacent portions of the image which have approximately equal magnitudes of reflected light intensity. The configurations are compared to a library of the alphanumeric characters stored in a portion of the electronics 50. Typically the comparison includes assigning a scaled value to the reflected light intensity of each pixel of the configuration, followed by a standard numerical correlation between the set of scaled values and a similar set of values of a digitized representation of each member of the alphanumeric character library. The character with the highest correlation (above a threshold) to the configuration is taken to be the character of that portion of the license number. Of course, the image analysis is not limited to alphanumeric characters or recognition symbols, as the system may "read" any discernible portion of the field of view that the electronics regards as a unique feature, based on the particular digitized representations stored in the electronics.

The preferred image analysis involves a comparison of the shapes formed by considering each configuration (potential character) as if it were lying within a rectangle of the same total height and width as all the characters, i.e., a character-sized "box" drawn around the configuration. This forms open areas, closed areas, curved corners and square corners formed by the outside portions of the potential character. These features generally gives a sufficient basis to identify a character by comparison to the known font, independent of character size. If the comparison indicates that the configuration may be either of the letters O or Q, the inside of the configuration is considered also. The comparison is made by the feature extraction method.

A system which uses separate illumination sources provides at least two advantages over the single-source systems in present use. First, as noted above, the low intensity source 20 used to locate the license plate image draws less power than the high intensity source 30 used to read the license number information, reducing the overall energy requirements of the system. For example, in the preferred embodiment, a 300 watt source is used for the low intensity illumination source 20. The high intensity illumination source, by contrast, has at least about 1200 watt-seconds output, and is strobed only when required to perform the second step of reading the license plate image, not every 1/30th second. Using a single source of illumination, which would necessarily be a high intensity source to ensure adequate illumination levels, would consume more energy than is necessary. Furthermore, typical existing power supplies cannot produce twelve hundred watt-seconds at a rate of thirty times per second, nor can conventional flash bulbs provide sufficient life at that power level and rate.

Second, use of separate illumination sources allows the use of separate pieces of imaging apparatus, i.e., detector 40 and analyzer 45, which leads to an increase in system speed. Because approximately one hundred times greater resolution is required to read the characters of a license plate image accurately than is required than to detect and locate such an image within a field of view, a relatively low pixel density array may be employed in the first step of locating the image of license plate 12 within the field of view 60. The use of two separate pieces of equipment increases the speed of the system 10, because the image produced by the lower density array necessarily has less information to analyze, and thus the image analysis may be performed in less time than if performed with a higher pixel density array, perhaps up to several hundred times per second. However, if desired, the functions of detector 40 may be performed by analyzer 45, but not the other way around because of the minimum resolution required to read the characters accurately.

There are two optional but preferred embodiments of the invention, and either may be employed if a single high pixel density detector 40 is used. In the first embodiment, the power output of the high intensity illumination source 30 is adjusted to account for changing conditions.

License plate reading systems are most effective if the characters of the license number are perfectly opaque, the edges of the characters are sharply defined against the background, and the license plate is clean. However, these conditions are not always present. Due to dirt alone, the brightness of license plates may vary by a factor of fifty, and thus the cleanliness of a plate passing a given point varies widely and randomly from plate to plate. A effective system must be able to read license plates which vary widely and randomly in dirtiness, age, and condition.

However, a high intensity source may be too bright for use with all license plates, because retroreflective materials concentrate retroreflected light within a small solid angle about the line of incident light transmission, a property well known in the art as "angularity." It is desirable to locate the high intensity light source very near the camera used to read the license plate, to keep the system installation compact and simplify the geometry underlying the image analysis. Due to the high angularity (large retroreflected intensity within a small solid angle) of retroreflective license plates presently in use, the small solid angle of the high intensity retroreflected light includes the camera location. When reflected by clean license plates, the intensity of retroreflected light is so great that the plate background image intensity overwhelms, or "blooms out," the license number image intensity, making the contrast between the two images too great for accurate analysis. "Blooming out" of the image is a problem exhibited by conventional video cameras.

This problem is minimized by the use of separate sources of illumination and (optionally) automatic adjustment of power levels. Once the license plate 12 is located with the low intensity illumination source 20, electronics 50 compares the measured intensity of the image may be compared to known or previously measured values. Electronics 50 then adjust the power output (i.e., the intensity and/or strobe time) of the high intensity light source 30. The known or previously measured values may be stored in the electronics 50, and optionally may be adjusted or updated by actual measurements obtained by system 10 in use. Automatic adjustment of the power output by electronics 50 helps ensure that the high intensity source is not powered above the minimum level required, reducing power requirements. Automatic adjustment of power levels also ensures that the reflected high intensity illumination is at an appropriate intensity level if the magnitude of the reflected low intensity illumination indicates that the license plate is relatively clean.

This technique is applicable to systems which use either retroreflected light or diffuse light to read license plates. For example, the system for reading license plate numbers taught by U.S. Pat. No. 4,731,854 (Gonzales), which is incorporated by reference into this specification, uses a single high powered source of illuminating radiation to both locate a retroreflective license plate and also read the license number on the plate. The Gonzales system recognizes that retroreflective license plates are easier to read with diffuse light than with retroreflective light. Retroreflective sheetings used for license plate backgrounds reflect incident polarized light without changing the incident polarization direction, but ink-coated, partially retroreflective license number characters reflect light which is diffuse and randomly polarized. Thus, as taught by Gonzales, a synchronized shutter 32 and cross-polarizer arrangement (a pair of polarizer 47) may be employed to eliminate the retroreflective component and allow only diffuse illumination to reach the system. The diffuse illumination is generally free of both excessively bright spots and excessively dark shadows, improving the ability of the system to identify the license number.

However, the Gonzales technique requires illumination which is approximately 1,000 times brighter than that which would otherwise be suitable for reading a license plate. In the Gonzales system, a pair of polarizers is used to filter out any retroreflective component of the license plate image, leaving the image due to reflection of diffuse light. Thus, the Gonzales illumination source must have a power output sufficient to illuminate the characters of a dirty license plate having poorly defined characters above the background intensity of diffuse light from the environment or other parts of the vehicle.

The second preferred embodiment is desired because the system should be designed to accommodate a large field of view. In general, license plates have varied locations on vehicles, and vehicles themselves have varied locations across the width of a road. Thus, a system must initially sample a fairly large field of view to ensure that the location of the license plate is included. At the instant of first illumination, the distance between the vehicle and the system should be as large as possible, which causes a large field of view. The large distance is desired so that the incident illumination strikes the license plate as perpendicularly as possible. This places the incident illumination within the most effective angular range of the retroreflective materials on the license plate, and minimizes distortion in character shape, shadows, etc. Furthermore, for reliability, a license plate should be located within the field of view and analyzed while the vehicle is at a distance such that a second analysis may be done if the first analysis is not successful.

Taking these factors and typical highway design into account, the system 10 may reliably detect a vehicle traveling up to one hundred thirty kilometers per hour (km/h) by first analyzing a field of view 60 which is at least about 1.5 square meters in area, or at least about the size of the front of a typical passenger vehicle 14. However, in a typical application, when the vehicle 14 is at a suitable distance, the system 10 is above and to the right (as viewed by the vehicle driver) of the vehicle 14 at angles of about 15° vertical offset and about 15° horizontal offset. At this geometry the solid angle cone of the camera view intercepts an area about two meters wide and 1.5 meters high, an area of three square meters. While this is a much larger area than the area of a typical license plate 12 (which is approximately 0.05 square meters in the United States and 0.1 square meters in Europe), assuming a typical traffic lane width of four meters about 99.7% of vehicles will pass through the camera view. However, because there are other brightly reflective objects on vehicle 14, such as turn signals, shiny trim, etc., which will be within such a large field of view 60, the system 10 may not immediately locate the license plate 12 within the field of view 60.

Thus, although it is sufficient in many applications to simply sample the entire field of view, the system should not attempt to analyze a portion of the field of view which is not a license plate. Thus, when a large field of view is used, the system 10 should incorporate techniques known in the art to optimize the ability of the system to locate the license plate image without confusing it with other bright sources of light. The methods taught by U.S. Pat. No. 4.491,923 (Look), incorporated by reference, are preferred. At column 5 line 37 to column 7 line 11, the following methods are taught: eliminating portions of the image which have a brightness below a threshold value known to represent only a retroreflective image; requiring that a suspected portion of the retroreflective image have substantially the same ratio of dimensions as would be expected of a license plate; and comparing successive images of the field of view so as to reject any portions not substantially present in each image. These techniques require a detector which has sufficient pixel density to sample and analyze portions of the field of view 60.

I claim:

1. A method of locating and analyzing a retroreflective vehicle identification article which comprises alphanumeric information and is located within a field of view, comprising the steps of:

(a) illuminating the field of view at a first power level, (b) detecting presence of the article within the field of view by retroreflection and shape of the article as a whole and potential alphanumeric information within that shape, (c) illuminating the field of view at a second power level greater than the first power level to produce an image of the article, and (d) extracting the alphanumeric information from the image of the article.

2. The method of claim 1 in which the retroreflection and shape of the article as a whole are characterized by a retroreflected image comprising retroreflected light having a light intensity value, step (b) further comprises measuring the light intensity value, and step (c) further comprises adjusting the second power level in response to the light intensity value.

3. The method of claim 1, further comprising the step of removing a retroreflective component from the image of the article produced in step (c).

4. An image analysis system for locating and analyzing a retroreflective vehicle identification article which comprises alphanumeric information and is located within a field of view, the system comprising (a) a first source of illumination of the field of view, (b) a second source of illumination of the field of view that has a higher power output than the first source of illumination, (c) means for detecting presence of the article within the field of view by reflection of illumination produced by the first source, (d) means for analyzing an image of the article produced by reflection of illumination produced by the second source, and (e) means for extracting the alphanumeric information from the image of the article.

5. The system of claim 4 further comprising means for measuring intensity of illumination reflected from the article and adjusting the power output of the second source according to the measured intensity.

6. The system of claim 4 further comprising a cross-polarizer arrangement to remove a retroreflective component from the image of the article.

* * * * *

UNITED STATES PATENT AND TRADEMARK OFFICE
CERTIFICATE OF CORRECTION

PATENT NO.  : 5,915,032
DATED       : June 22, 1999
INVENTOR(S) : Thomas F. Look It is certified that error appears in the above-identified patent and that said Letters Patent is hereby corrected as shown below:

On title page [56] References Cited - Foreign Patent Document
    insert --0 298 343 1/1989 European Pat. Off. G07B 15/02--
    --2 127 096 10/1972 France G06K 9/00--.

Col. 4, line 50 "adjust" should read --adjusts--.

Signed and Sealed this

Fifteenth Day of May, 2001

Attest:

NICHOLAS P. GODICI

Attesting Officer     Acting Director of the United States Patent and Trademark Office